United States Patent
Graves et al.

(10) Patent No.: US 12,356,294 B2
(45) Date of Patent: Jul. 8, 2025

(54) COORDINATED EXCHANGE OF AUXILIARY SESSION DATA FOR MULTI-PLATFORM ENVIRONMENTS

(71) Applicant: T-Mobile USA, Inc., Bellevue, WA (US)

(72) Inventors: Brian Graves, Kenmore, WA (US); Dewayne Brandon, Aurora, CO (US)

(73) Assignee: T-Mobile USA, Inc., Bellevue, WA (US)

( * ) Notice: Subject to any disclaimer, the term of this patent is extended or adjusted under 35 U.S.C. 154(b) by 447 days.

(21) Appl. No.: 17/969,559

(22) Filed: Oct. 19, 2022

(65) Prior Publication Data

US 2024/0137735 A1 Apr. 25, 2024
US 2024/0236625 A9 Jul. 11, 2024

(51) Int. Cl.
| | |
|---|---|
| *H04W 8/18* | (2009.01) |
| *H04L 65/1096* | (2022.01) |
| *H04L 65/1104* | (2022.01) |
| *H04M 15/00* | (2006.01) |
| *H04W 4/16* | (2009.01) |

(52) U.S. Cl.
CPC ........... *H04W 4/16* (2013.01); *H04L 65/1096* (2013.01); *H04L 65/1104* (2022.05); *H04M 15/8228* (2013.01); *H04W 8/18* (2013.01)

(58) Field of Classification Search
CPC ......... H04S 1/005; G10L 15/22; G06F 3/167; G06F 3/162; G06Q 30/0204; G08C 23/02; H04M 3/02; H04W 4/14; H04W 4/16; H04W 4/20
See application file for complete search history.

(56) References Cited

U.S. PATENT DOCUMENTS

| | | | |
|---|---|---|---|
| 6,404,762 B1 | 6/2002 | Luzeski et al. | |
| 7,054,866 B2 | 5/2006 | Trivedi | |
| 7,804,953 B1 | 9/2010 | Antonios et al. | |
| 8,195,738 B2 | 6/2012 | Trivedi | |
| 8,442,506 B2 | 5/2013 | Peacock | |
| 10,564,893 B2 | 2/2020 | Venetsanopoulos et al. | |

(Continued)

FOREIGN PATENT DOCUMENTS

| | | |
|---|---|---|
| CN | 1262836 A | 8/2000 |
| CN | 1666476 A | 9/2005 |

(Continued)

*Primary Examiner* — Phuoc H Doan
(74) *Attorney, Agent, or Firm* — Perkins Coie LLP (57) ABSTRACT

Aspects of the disclosure relate to cross-platform exchange and sharing of auxiliary session data in connection with a transfer of a communication session. For example, with transfer of a voice call from a first platform to a second platform, the first platform shares profile data for a call participant to the second platform. In an example method, a first platform at which a user is connected to a communication session retrieves auxiliary session data. The first platform determines a transfer of the session to a second platform and sends a data record that includes the auxiliary session data to the second platform. The first platform transfers the communication session via a different cross-platform channel with a token that uniquely identifies the first platform and the data record. Accordingly, the token can be used by the second platform to locate the data record for use during the communication session.

20 Claims, 6 Drawing Sheets

(56) References Cited

U.S. PATENT DOCUMENTS

| | | |
|---|---|---|
| 10,635,657 B1 | 4/2020 | Prakash et al. |
| 10,673,958 B1 | 6/2020 | Wylie et al. |
| 11,100,531 B2 | 8/2021 | Sussman et al. |
| 11,140,271 B2 | 10/2021 | Lu et al. |
| 11,301,169 B2 | 4/2022 | Venetsanopoulos et al. |
| 2021/0058472 A1 | 2/2021 | Wylie et al. |
| 2022/0005067 A1 | 1/2022 | Sussman et al. |
| 2022/0360663 A1* | 11/2022 | Kempson .......... H04M 3/42306 |
| 2023/0110404 A1* | 4/2023 | Raj Susairaju ..... H04M 3/5183 379/201.01 |

FOREIGN PATENT DOCUMENTS

| | | | |
|---|---|---|---|
| CN | 102123151 | A | 7/2011 |
| CN | 105718466 | A | 6/2016 |
| CN | 113010485 | A | 6/2021 |
| EP | 1388039 | A1 | 2/2004 |
| EP | 1677487 | A1 | 7/2006 |
| EP | 2283610 | A2 | 2/2011 |
| EP | 3272079 | B1 | 6/2021 |
| EP | 3839761 | A1 | 6/2021 |
| KR | 20140138871 | A | 12/2014 |
| WO | 2013158098 | A1 | 10/2013 |
| WO | 2014195809 | A1 | 12/2014 |
| WO | 2015054531 | A1 | 4/2015 |
| WO | 2016178015 | A1 | 11/2016 |

\* cited by examiner

COORDINATED EXCHANGE OF AUXILIARY SESSION DATA FOR MULTI-PLATFORM ENVIRONMENTS

BACKGROUND

Distinct platforms manage and store data for individual purposes. Some cross-platform processes and flows require cooperation of different platforms, or sharing and exchange of such platform- or domain-specific data. For example, handling and management of communication sessions can involve cross-platform processes and flows.

BRIEF DESCRIPTION OF THE DRAWINGS

Detailed descriptions of implementations of the present invention will be described and explained through the use of the accompanying drawings.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

The disclosed technology relates to coordinated exchange or sharing of auxiliary session data in connection with a transfer of a communication session between platforms. The technology can be implemented in multi-platform systems or environments within which communication sessions are transferred, or at a given platform that transfers a communication session or to which a communication session is transferred.

Generally, platforms configured for hosting and connecting communication sessions each individually store auxiliary session data that serve auxiliary functions related to the communication sessions. For example, a given platform stores profile or account data for known users that connect to communication sessions, and the profile or account data is automatically accessed and used during communication sessions. In various examples, the auxiliary session data stored by platforms is unique, domain-specific, and not easily shared or interpretable by other platforms.

Further, transfer of a communication session between different platforms involves coordinated handshakes between said platforms so that the session is transferred without significant interruption. Standard messages and signaling for these handshakes are not equipped to include auxiliary session data. As such, a target platform to which a communication session is transferred lacks potential benefits provided by auxiliary session data available to an originating platform. Inefficiencies then arise, with the target platform re-querying users connected to the communication session or routing decisions failing to be resolved, in some examples. In a specific example of two distinct call center platforms, transfer of a communication session results in failure of screen pop operations, unavailability of certain billing operations, and occurrence of routing loops. The disclosed technology addresses at least these technical challenges.

In one example, to enable cross-platform exchange, an originating platform transmits the auxiliary session data to the target platform via a cross-platform channel. The cross-platform channel is distinct from another cross-platform channel by which the communication session is transferred. As the communication session is transferred, the session is accompanied by a token that references the auxiliary session data. In particular, the token can uniquely identify both the originating platform and the auxiliary session data.

In some implementations, the token uniquely identifies both the originating platform and a data record that includes the auxiliary session data based on including a concatenation of a unique identifier for the originating platform and a unique identifier for the data record. In some examples, the token is a multi-factor token for identifying both the originating platform and a data record. Other identifying factors can be included in the token, such as an identifier for a participating user in the communication session, an identifier for the communication session itself, and/or the like. With the multi-factor aspect of the token (e.g., inclusion of multiple identifiers), auxiliary session data in possession of the target platform is readily retrievable and linkable to the communication session, amidst a large volume of data received from multiple platforms and multiple communications sessions, for example. Additionally, the token is lightweight, as less data is needed to uniquely identify a particular data record of auxiliary session data. With the token being lightweight, the token can be included in a signaling message related to the transfer of the communication session. Thus, the token accompanies the communication session and references auxiliary session data that is transferred separately.

As such, implementations disclosed herein enable a target platform to which a communication session is transferred to possess and use auxiliary session data to support the communication session. Example implementations provide scalability for environments in which large volumes of platforms communicate with one another. Example implementations are widely applicable as a particular protocol is not relied upon for a target platform to possess and obtain auxiliary session data using a token.

Figure 1:
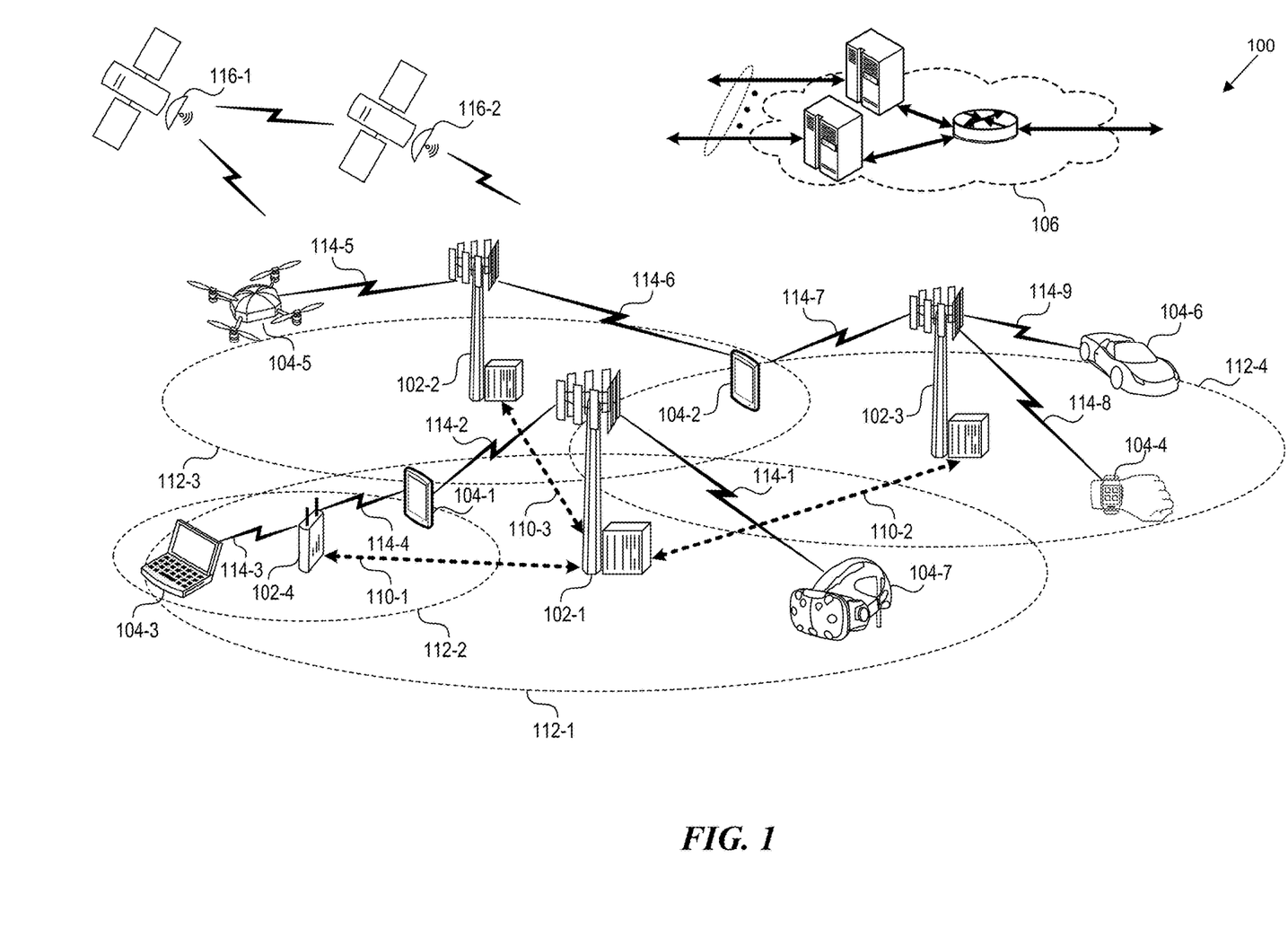
FIG. 1 is a block diagram that illustrates a wireless communications system that can implement aspects of the present technology.

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail, to avoid unnecessarily obscuring the descriptions of examples.
Exemplary Wireless Communications System FIG. 1 is a block diagram that illustrates a wireless telecommunication network 100 in which aspects of the disclosed technology are incorporated. For example, networks, platforms, or systems that exchange auxiliary session data with one another can do so based on transmitting data via the wireless telecommunication network 100. The networks can also transmit messages to one another via the wireless telecommunication network 100 to facilitate a transfer of a communication session. Further, users or participants of an initiated communication session can connect to a network or system that hosts the communication session via the wireless telecommunication network 100.

The wireless telecommunication network 100 includes base stations 102-1 through 102-4 (also referred to individually as "base station 102" or collectively as "base stations 102"). A base station is a type of network access node (NAN) that can also be referred to as a cell site, a base transceiver station, or a radio base station. The wireless telecommunication network 100 can include any combination of NANs including an access point, radio transceiver, gNodeB (gNB), NodeB, eNodeB (eNB), Home NodeB or Home eNodeB, or the like. In addition to being a wireless wide area network (WWAN) base station, a NAN can be a wireless local area network (WLAN) access point, such as an Institute of Electrical and Electronics Engineers (IEEE) 802.11 access point.

The NANs of the wireless telecommunication network 100 also include wireless devices 104-1 through 104-7 (referred to individually as "wireless device 104" or collectively as "wireless devices 104") and a core network 106. The wireless devices 104-1 through 104-7 can correspond to or include network entities capable of communication using various connectivity standards. For example, a 5G communication channel can use millimeter wave (mmW) access frequencies of 28 GHz or more. In some implementations, the wireless device 104 can operatively couple to a base station 102 over a long-term evolution/long-term evolution-advanced (LTE/LTE-A) communication channel, which is referred to as a 4G communication channel.

The core network 106 provides, manages, and controls security services, user authentication, access authorization, tracking, Internet Protocol (IP) connectivity, and other access, routing, or mobility functions. The base stations 102 interface with the core network 106 through a first set of backhaul links (e.g., S1 interfaces) and can perform radio configuration and scheduling for communication with the wireless devices 104 or can operate under the control of a base station controller (not shown). In some examples, the base stations 102 can communicate with each other, either directly or indirectly (e.g., through the core network 106), over a second set of backhaul links 110-1 through 110-3 (e.g., X1 interfaces), which can be wired or wireless communication links.

The base stations 102 can wirelessly communicate with the wireless devices 104 via one or more base station antennas. The cell sites can provide communication coverage for geographic coverage areas 112-1 through 112-4 (also referred to individually as "coverage area 112" or collectively as "coverage areas 112"). The geographic coverage area 112 for a base station 102 can be divided into sectors making up only a portion of the coverage area (not shown). The wireless telecommunication network 100 can include base stations of different types (e.g., macro and/or small cell base stations). In some implementations, there can be overlapping geographic coverage areas 112 for different service environments (e.g., Internet-of-Things (IoT), mobile broadband (MBB), vehicle-to-everything (V2X), machine-to-machine (M2M), machine-to-everything (M2X), ultra-reliable low-latency communication (URLLC), machine-type communication (MTC), etc.).

The wireless telecommunication network 100 can include a 5G network and/or an LTE/LTE-A or other network. In an LTE/LTE-A network, the term eNB is used to describe the base stations 102, and in 5G new radio (NR) networks, the term gNBs is used to describe the base stations 102 that can include mmW communications. The wireless telecommunication network 100 can thus form a heterogeneous network in which different types of base stations provide coverage for various geographic regions. For example, each base station 102 can provide communication coverage for a macro cell, a small cell, and/or other types of cells. As used herein, the term "cell" can relate to a base station, a carrier or component carrier associated with the base station, or a coverage area (e.g., sector) of a carrier or base station, depending on context.

A macro cell generally covers a relatively large geographic area (e.g., several kilometers in radius) and can allow access by wireless devices that have service subscriptions with a wireless network service provider. As indicated earlier, a small cell is a lower-powered base station, as compared to a macro cell, and can operate in the same or different (e.g., licensed, unlicensed) frequency bands as macro cells. Examples of small cells include pico cells, femto cells, and micro cells. In general, a pico cell can cover a relatively smaller geographic area and can allow unrestricted access by wireless devices that have service subscriptions with the network provider. A femto cell covers a relatively smaller geographic area (e.g., a home) and can provide restricted access by wireless devices having an association with the femto unit (e.g., wireless devices in a closed subscriber group (CSG), wireless devices for users in the home). A base station can support one or multiple (e.g., two, three, four, and the like) cells (e.g., component carriers). All fixed transceivers noted herein that can provide access to the wireless telecommunication network 100 are NANs, including small cells.

The communication networks that accommodate various disclosed examples can be packet-based networks that operate according to a layered protocol stack. In the user plane, communications at the bearer or Packet Data Convergence Protocol (PDCP) layer can be IP-based. A Radio Link Control (RLC) layer then performs packet segmentation and reassembly to communicate over logical channels. A Medium Access Control (MAC) layer can perform priority handling and multiplexing of logical channels into transport channels. The MAC layer can also use Hybrid ARQ (HARQ) to provide retransmission at the MAC layer, to improve link efficiency. In the control plane, the Radio Resource Control (RRC) protocol layer provides establishment, configuration, and maintenance of an RRC connection between a wireless device 104 and the base stations 102 or core network 106 supporting radio bearers for the user plane data. At the Physical (PHY) layer, the transport channels are mapped to physical channels.

Wireless devices can be integrated with or embedded in other devices. As illustrated, the wireless devices 104 are distributed throughout the wireless telecommunication network 100, where each wireless device 104 can be stationary or mobile. For example, wireless devices can include handheld mobile devices 104-1 and 104-2 (e.g., smartphones, portable hotspots, tablets, etc.); laptops 104-3; wearables 104-4; drones 104-5; vehicles with wireless connectivity 104-6; head-mounted displays with wireless augmented reality/virtual reality (ARNR) connectivity 104-7; portable gaming consoles; wireless routers, gateways, modems, and other fixed-wireless access devices; wirelessly connected sensors that provides data to a remote server over a network; IoT devices such as wirelessly connected smart home appliances, etc.

A wireless device (e.g., wireless devices 104-1, 104-2, 104-3, 104-4, 104-5, 104-6, and 104-7) can be referred to as a user equipment (UE), a customer premise equipment (CPE), a mobile station, a subscriber station, a mobile unit, a subscriber unit, a wireless unit, a remote unit, a handheld mobile device, a remote device, a mobile subscriber station, terminal equipment, an access terminal, a mobile terminal, a wireless terminal, a remote terminal, a handset, a mobile client, a client, or the like.

A wireless device can communicate with various types of base stations and network equipment at the edge of the wireless telecommunication network 100 including macro eNBs/gNBs, small cell eNBs/gNBs, relay base stations, and the like. A wireless device can also communicate with other wireless devices either within or outside the same coverage area of a base station via device-to-device (D2D) communications.

The communication links 114-1 through 114-9 (also referred to individually as "communication link 114" or collectively as "communication links 114") shown in wireless telecommunication network 100 include uplink (UL) transmissions from a wireless device 104 to a base station 102, and/or downlink (DL) transmissions from a base station 102 to a wireless device 104. The downlink transmissions can also be called forward link transmissions while the uplink transmissions can also be called reverse link transmissions. Each communication link 114 includes one or more carriers, where each carrier can be a signal composed of multiple sub-carriers (e.g., waveform signals of different frequencies) modulated according to the various radio technologies. Each modulated signal can be sent on a different sub-carrier and carry control information (e.g., reference signals, control channels), overhead information, user data, etc. The communication links 114 can transmit bidirectional communications using frequency division duplex (FDD) (e.g., using paired spectrum resources) or Time division duplex (TDD) operation (e.g., using unpaired spectrum resources). In some implementations, the communication links 114 include LTE and/or mmW communication links.

In some implementations of the wireless telecommunication network 100, the base stations 102 and/or the wireless devices 104 include multiple antennas for employing antenna diversity schemes to improve communication quality and reliability between base stations 102 and wireless devices 104. Additionally or alternatively, the base stations 102 and/or the wireless devices 104 can employ multiple-input, multiple-output (MIMO) techniques that can take advantage of multi-path environments to transmit multiple spatial layers carrying the same or different coded data.

In some examples, the wireless telecommunication network 100 implements 6G technologies including increased densification or diversification of network nodes. The wireless telecommunication network 100 can enable terrestrial and non-terrestrial transmissions. In this context, a Non-Terrestrial Network (NTN) is enabled by one or more satellites such as satellites 116-1 and 116-2 to deliver services anywhere and anytime and provide coverage in areas that are unreachable by any conventional Terrestrial Network (TN). A 6G implementation of the wireless telecommunication network 100 can support terahertz (THz) communications. This can support wireless applications that demand ultra-high quality of service requirements and multi-terabits per second data transmission in the 6G and beyond era, such as terabit-per-second backhaul systems, ultrahigh-definition content streaming among mobile devices, AR/VR, and wireless high-bandwidth secure communications. In another example of 6G, the wireless telecommunication network 100 can implement a converged Radio Access Network (RAN) and Core architecture to achieve Control and User Plane Separation (CUPS) and achieve extremely low User Plane latency. In yet another example of 6G, the wireless telecommunication network 100 can implement a converged Wi-Fi and Core architecture to increase and improve indoor coverage.

Exemplary 5G Core Network Functions

Figure 2:
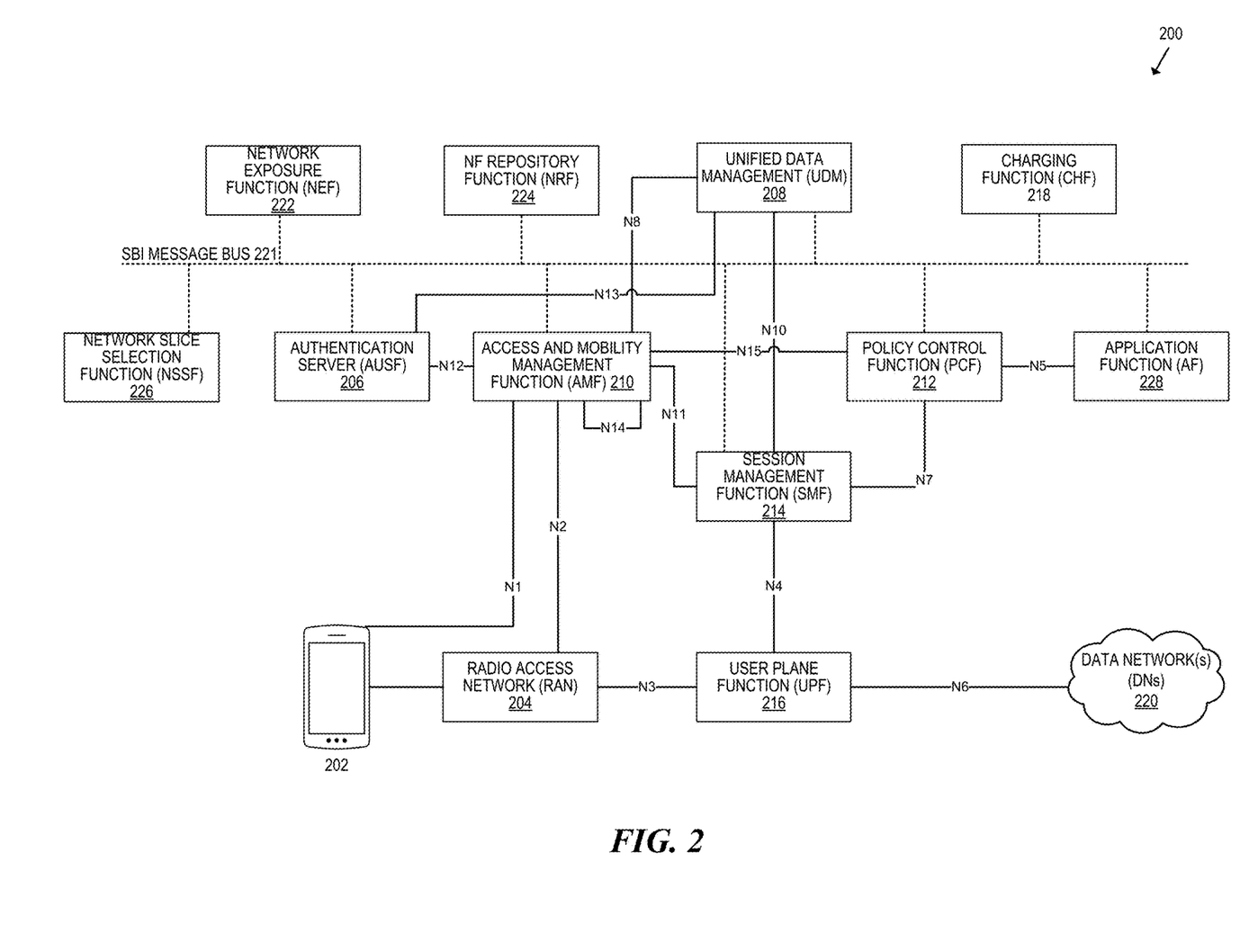
FIG. 2 is a block diagram that illustrates 5G core network functions (NFs) that can implement aspects of the present technology.

FIG. 2 is a block diagram that illustrates an architecture 200 including 5G core network functions (NFs) that can implement aspects of the present technology. A wireless device 202 can access the 5G network through a NAN (e.g., gNB) of a RAN 204. The NFs include an Authentication Server Function (AUSF) 206, a Unified Data Management (UDM) 208, an Access and Mobility management Function (AMF) 210, a Policy Control Function (PCF) 212, a Session Management Function (SMF) 214, a User Plane Function (UPF) 216, and a Charging Function (CHF) 218.

The interfaces N1 through N15 define communications and/or protocols between each NF as described in relevant standards. The UPF 216 is part of the user plane and the AMF 210, SMF 214, PCF 212, AUSF 206, and UDM 208 are part of the control plane. One or more UPFs can connect with one or more data networks (DNs) 220. The UPF 216 can be deployed separately from control plane functions. The NFs of the control plane are modularized such that they can be scaled independently. As shown, each NF service exposes its functionality in a Service Based Architecture (SBA) through a Service Based Interface (SBI) 221 that uses HTTP/2. The SBA can include a Network Exposure Function (NEF) 222, a NF Repository Function (NRF) 224 a Network Slice Selection Function (NSSF) 226, and other functions such as a Service Communication Proxy (SCP).

The SBA can provide a complete service mesh with service discovery, load balancing, encryption, authentication, and authorization for interservice communications. The SBA employs a centralized discovery framework that leverages the NRF 224, which maintains a record of available NF instances and supported services. The NRF 224 allows other NF instances to subscribe and be notified of registrations from NF instances of a given type. The NRF 224 supports service discovery by receipt of discovery requests from NF instances and, in response, details which NF instances support specific services.

The NSSF 226 enables network slicing, which is a capability of 5G to bring a high degree of deployment flexibility and efficient resource utilization when deploying diverse network services and applications. A logical end-to-end (E2E) network slice has pre-determined capabilities, traffic characteristics, service-level agreements, and includes the virtualized resources required to service the needs of a Mobile Virtual Network Operator (MVNO) or group of subscribers, including a dedicated UPF, SMF, and PCF. The wireless device 202 is associated with one or more network slices, which all use the same AMF. A Single Network Slice Selection Assistance Information (S-NSSAI) function operates to identify a network slice. Slice selection is triggered by the AMF, which receives a wireless device registration request. In response, the AMF retrieves permitted network slices from the UDM 208 and then requests an appropriate network slice of the NSSF 226.

The UDM 208 introduces a User Data Convergence (UDC) that separates a User Data Repository (UDR) for storing and managing subscriber information. As such, the UDM 208 can employ the UDC under 3GPP TS 22.101 to support a layered architecture that separates user data from application logic. The UDM 208 can include a stateful message store to hold information in local memory or can be stateless and store information externally in a database of the UDR. The stored data can include profile data for subscribers and/or other data that can be used for authentication purposes. Given a large number of wireless devices that can connect to a 5G network, the UDM 208 can contain voluminous amounts of data that is accessed for authentication. Thus, the UDM 208 is analogous to a Home Subscriber Server (HSS), to provide authentication credentials while being employed by the AMF 210 and SMF 214 to retrieve subscriber data and context.

The PCF 212 can connect with one or more application functions (AFs) 228. The PCF 212 supports a unified policy framework within the 5G infrastructure for governing network behavior. The PCF 212 accesses the subscription information required to make policy decisions from the UDM 208, and then provides the appropriate policy rules to the control plane functions so that they can enforce them. The SCP (not shown) provides a highly distributed multi-access edge compute cloud environment and a single point of entry for a cluster of network functions, once they have been successfully discovered by the NRF 224. This allows the SCP to become the delegated discovery point in a datacenter, offloading the NRF 224 from distributed service meshes that make-up a network operator's infrastructure. Together with the NRF 224, the SCP forms the hierarchical 5G service mesh.

The AMF 210 receives requests and handles connection and mobility management while forwarding session management requirements over the N11 interface to the SMF 214. The AMF 210 determines that the SMF 214 is best suited to handle the connection request by querying the NRF 224. That interface and the N11 interface between the AMF 210 and the SMF 214 assigned by the NRF 224, use the SBI 221. During session establishment or modification, the SMF 214 also interacts with the PCF 212 over the N7 interface and the subscriber profile information stored within the UDM 208. Employing the SBI 221, the PCF 212 provides the foundation of the policy framework which, along with the more typical QoS and charging rules, includes Network Slice selection, which is regulated by the NSSF 226.

Multi-Platform Systems

Figure 3:
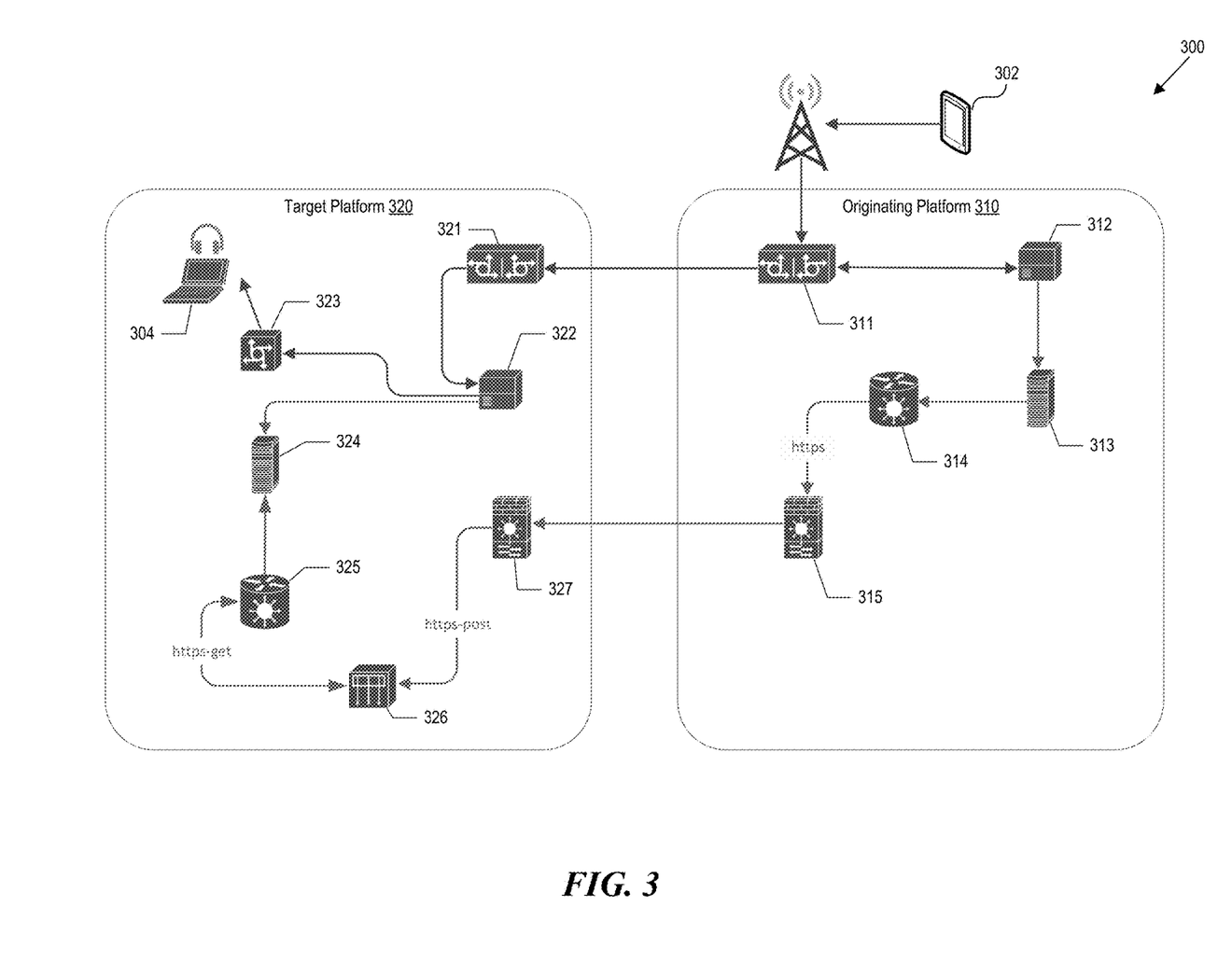
FIG. 3 is a block diagram that illustrates an example multi-platform system in which data records are exchanged in connection with communication session transfers.

FIG. 3 illustrates an example multi-platform system in which communication sessions are transferred between the platforms of the system. In one example, the multi-platform system 300 is a call routing environment that includes multiple platforms each having different call agents of different domains. According to aspects disclosed herein, the multi-platform system 300 is configured for auxiliary session data to be shared in connection with a transfer of a communication session (e.g., voice call, a video call, an instant messaging session).

As illustrated in FIG. 3, the multi-platform system 300 includes an originating platform 310 and a target platform 320. A user device 302 connects to the originating platform 310 for a communication session via a network, such as the wireless telecommunication network 100. With the user device 302 connecting to the originating platform 310, the originating platform 310 is configured to initiate, establish, and host a communication session for the user device 302. For example, the communication session is a voice over IP (VoIP) call, an Internet telephony call, a video conference call, a video meeting, an instant messaging session, an Internet chat room, and/or the like. In some examples, the communication session is a session that is initiated, maintained, and terminated using Session Initiation Protocol (SIP).

The originating platform 310 includes a network function 311 via which the user device 302 is connected to the originating platform 310. In one example, the network function 311 is a session border controller (SBC) configured to interface with the network (e.g., wireless telecommunication network 100) by which the user device 302 connects to the originating platform 310.

In some implementations, the originating platform 310 includes an information collection module 312. In some examples, the information collection module 312 is configured to prompt domain information from the user device 302, and for example, the information collection module 312 is embodied by an interactive voice response (IVR) module. For example, the information collection module 312, embodied by an IVR module, plays voice prompts that ask the user device 302 in the communication session for user information, a reason for initiating the communication session, a desired recipient or participant for the session, and/or the like. As another example, the information collection module 312 collects a voiceprint of the user for authorization or security purposes during the communication session. In yet another example, the information collection module 312 transcribes and/or records at least a portion of the communication session. Thus, the information collection module 312 collects information relevant to the user device 302 and the communication session.

The originating platform 310 includes a data storage or a database module 313, embodied by an in-memory data grid, a disk-based database, a data management system, and/or the like. In some implementations, the database module 313 stores auxiliary session data for known users, subscribers, or users associated with the originating platform 310. With the communication session, the originating platform 310 retrieves auxiliary session data from the database module 313 automatically based on identification of the user and/or based on user indications and responses collected by the information collection module 312.

For example, the database module 313 stores profile or account data for users, including the user device 302, and the originating platform 310 retrieves such data to be displayed or populated to participants of the communication session. As another example, the database module 313 stores historical data (e.g., text transcriptions, audio recordings, video recordings) for users that describe past communication sessions. In yet another example, the database module 313 stores billing or payment information for users, including a user of the user device 302, such that the user can authorize and complete payments over the communication session. In yet another example, the database module 313 stores a voiceprint of the user (e.g., a voiceprint collected by the information collection module 312 during the communication session). In yet another example, the database module 313 stores a text transcription, an audio recording, and/or a video recording of the communication session (e.g., collected by the information collection module 312).

The originating platform 310 further includes an application gateway 314, which is configured to enable communication with other platforms, such as the target platform 320.

In some implementations, the application gateway 314 is configured to send auxiliary session data to the target platform 320. The application gateway 314 is configured to do so based on a determination to transfer the communication session with the user device 302 to the target platform 320. For example, the originating platform 310 determines that a desired participant or recipient for the communication session resides or is located in the target platform 320. In another example, the originating platform 310 determines that a current load or capacity at the originating platform 310 exceeds a threshold, and that the communication session should be transferred to the target platform 320 for load balancing. In yet another example, the originating platform 310 determines that the target platform 320 is more specific or relevant to a particular domain related to a reason or purpose for the communication session.

Thus, according to example implementations, the application gateway 314 is configured to access the auxiliary session data stored in the database module 313. In some implementations, the application gateway 314 is configured to translate the protocol used to transmit the data from one protocol to another more standard format, such as a Hyper-Text Transfer Protocol (HTTP). As such, the auxiliary session data can be received by other platforms, such as the target platform 320, that are configured to receive data according to the more standard format. Scalability is improved then, as a population of platforms to which the application gateway 314 can send data records is increased due to the protocol translation by the application gateway 314.

The application gateway 314 is configured to send a data record that includes (i) the auxiliary session data specific to (i) the user and/or (ii) the communication session to the target platform 320, via a router 315. In an example, the application gateway 314 identifies an IP address associated with the target platform 320 (or a router thereof) and causes the data record to be transmitted to the target platform 320. In some implementations, the originating platform 310 transmits the data record via a network switch with the target platform 320. In some implementations, the originating platform 310 transmits the data record with an application programming interface (API) call or query to the target platform 320.

The originating platform 310 is configured to transfer the communication session to the target platform 320, such as via the network function 311 (e.g., an SBC). In some implementations, the originating platform 310 performs peering operations to transfer the communication session to the target platform 320. In some implementations, the originating platform 310 performs a handshake or a signaling according to SIP to accomplish the transfer of the communication session to the target platform 320.

Thus, in the context of FIG. 3, the originating platform 310 is configured to initiate a communication session with a user device 302, transfer the communication session to a target platform 320, and transmit a data record that includes auxiliary session data to the target platform 320. As illustrated in FIG. 3, the communication session and the data record are transferred/transmitted/copied across different cross-platform channels or flows. As such, a protocol to transfer the communication session is not significantly delayed by including the auxiliary session data.

A data token that identifies a data record can accompany transfer of the communication session from the originating platform 310 to the target platform 320, such that the target platform 320 can identify the data record of the communication session despite the data record being communicated to the target platform 320 separately. In particular, the data token uniquely identifies the data record, such as by including a first identifier associated with the originating platform 310 and a second identifier associated with the data record. With the multi-factor structure (e.g., inclusion and/or concatenation of multiple identifiers), the token is configured to be lightweight and scalable for a large population of platforms. In some implementations, the data token is included in a SIP message related to the transfer of the communication session. In an example, the data token is included in a SIP header involved in the signaling for the session transfer.

In some implementations, the data token is platform-agnostic or platform-independent. The data token is created by any originating platform that transfers data records and identifies a respective originating platform in an interpretable manner by a target or receiving platform. As discussed, the data token includes a unique identifier for the respective originating platform. In an example, the unique identifier is a globally unique identifier (GUID), a universally unique identifier (UUID), and/or the like assigned to the platform. In another example, the unique identifier is a hash or unique representation of an address of the platform.

Generation/creation of the token is triggered by a determination of the originating platform to separately transfer a communication session and a data record to a target platform. That is, the token is used in example scenarios in which the communication session is transferred via a first cross-platform channel and the data record is transferred via a second cross-platform channel. In the illustrated implementation, the first cross-platform channel is a SIP communication channel, while the second cross-platform channel is an API communication channel.

Turning now to the target platform 320, the target platform 320 in the context of FIG. 3 represents a platform to which a communication session is transferred. As disclosed, the target platform 320 additionally receives a data record via a distinct cross-platform channel or flow, and the data record includes auxiliary session data associated with the communication session.

As illustrated, the target platform 320 includes a target network function 321 that interfaces with the network function 311 of the originating platform 310 for the transfer of the communication session. In an example, the target network function 321 is an SBC engaged in peering with the network function 311 of the originating platform 310.

With an auxiliary function module 322 and a session management module 323, the target platform 320 connects a participant device 304 to the communication session with the user device 302. In an example, the participant device 304 is a call agent associated with the target platform 320.

The auxiliary function module 322 is configured to perform auxiliary functions for the communication session and for the participant device 304. In an example, the auxiliary function module 322 causes display of user-specific data for the participant device 304, enables billing and payment operations for the user, verifies voiceprints of the user, generates a text transcription of the communication session, generates an audio and/or video recording of the communication session, and/or the like.

According to example implementations, the auxiliary function module 322 uses auxiliary session data that originates from the originating platform 310 to perform the auxiliary functions for the communication session and for the participant device 304. In an example, the auxiliary function module 322 uses profile, historical, and/or account data for the user that originates from the originating platform 310 for display-related and/or payment-related operations.

In another example, the auxiliary function module 322 uses a voiceprint that originates from the originating platform 310 for authentication or security operations. In yet another example, the auxiliary function module 322 combines a transcription and/or recording of the communication session that originates from the originating platform 310 with a transcription and/or recording of the communication session as the session occurs at the target platform 320.

To use the auxiliary session data, the auxiliary function module 322 is configured to obtain or retrieve the data record that was received by the target platform and that includes the auxiliary session data. In some implementations, the data record or the auxiliary session data included in the data record is stored at a first database module 324 that is accessible by the auxiliary function module 322.

In some implementations, the auxiliary function module 322 obtains the data record and/or the auxiliary session data from a target application gateway 325. In an example, the target application gateway 325 stores the data record and/or the auxiliary session data at the first database module 324. In some implementations, the target application gateway 325 does so based on retrieving the data record from a second database module 326 at which data records from other platforms (e.g., the originating platform 310) are deposited and/or stored.

In the illustrated example, a target router 327 that receives the data record stores the data record at the second database module 326 with a https-post operation. As discussed, the data record is sent in accordance with HTTP by the originating platform 310, or another format or protocol interpretable by the target platform 320. The target application gateway 325 retrieves the data record from the second database module 326 with a https-get operation. In particular, the target application gateway 325 is configured to retrieve the data record using the data token received by the target platform 320 with the transfer of the communication session. As discussed, the data token uniquely identifies the originating platform 310 and the data record. In some implementations, the second database module 326 accordingly stores a plurality of data records such that a specific data record can be identified based on the originating platform 310 and a record identifier.

Thus, the target platform 320 obtains auxiliary session data via a distinct cross-platform channel or flow as the communication session is transferred to the target platform 320. The target platform 320 is then able to provide auxiliary functions to the participant device 304 residing at the target platform 320 during the communication session.

Figure 4:
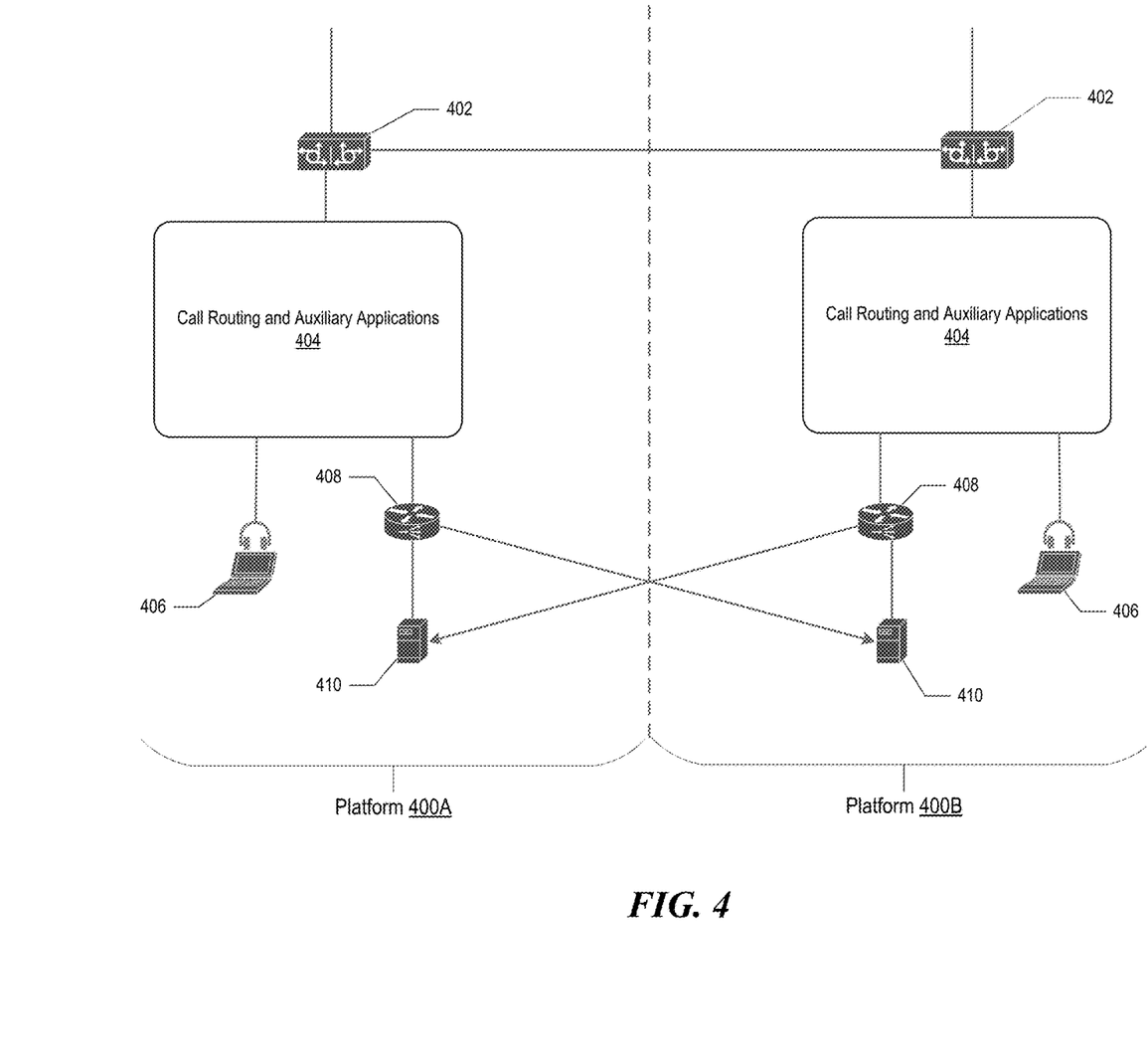
FIG. 4 is a block diagram that illustrates example platforms between which data records are exchanged in connection with communication session transfers.

FIG. 4 illustrates two platforms 400A and 400B (collectively referred to as "platforms 400" and individually referred to as "platform 400") that include components and modules for sharing auxiliary session data with one another in connection with a transfer of a communication session to one another. The platforms 400 are configured for sharing or exchanging auxiliary session data in connection with a transfer of a communication session. As illustrated in FIG. 4, a platform 400 can embody both an originating platform 310 and a target platform 320. In an example, a given platform is configured to send a data record to another platform as a communication session is transferred to the other platform, while also being configured to receive data records from other platforms.

The platforms 400 include network functions 402 that provide connection with user devices for communication sessions. The network functions 402 of the platforms 400 interface with each other for the transfer of a communication session, such as with signaling to handover connection with a given user.

The platforms 400 include call routing and auxiliary applications 404. These applications 404 enable the platforms 400 to connect participants 406 to a communication session with a given user. The applications 404 also serve to provide auxiliary functions during communication session, such as IVR capabilities, screen pop operations, billing operations, transcription, recording capabilities, authentication capabilities, and/or the like.

The platforms 400 further include gateways 408 that are configured to exchange auxiliary session data with other platforms 400. As illustrated, a given gateway of a platform 400 is configured to transmit data records that include auxiliary session data to a database 410 of another platform. In some implementations, a given gateway transmits a data record to an external database via an API of the external platform. The given gateway is also configured to retrieve data records stored in a database 410 local to the same platform. In some implementations, a given database stores data records received from multiple external platforms, and the given database stores a given data record with an indication of the platform from which the given data record originates. Thus, a gateway 408 can retrieve a data record from a database 410 in the same platform 400 given an identifier of an originating platform and an identifier for the specific record. With retrieval of a data record, a gateway 408 provides auxiliary session data for the call routing and auxiliary applications 404.

Exemplary Operations

Figure 5:
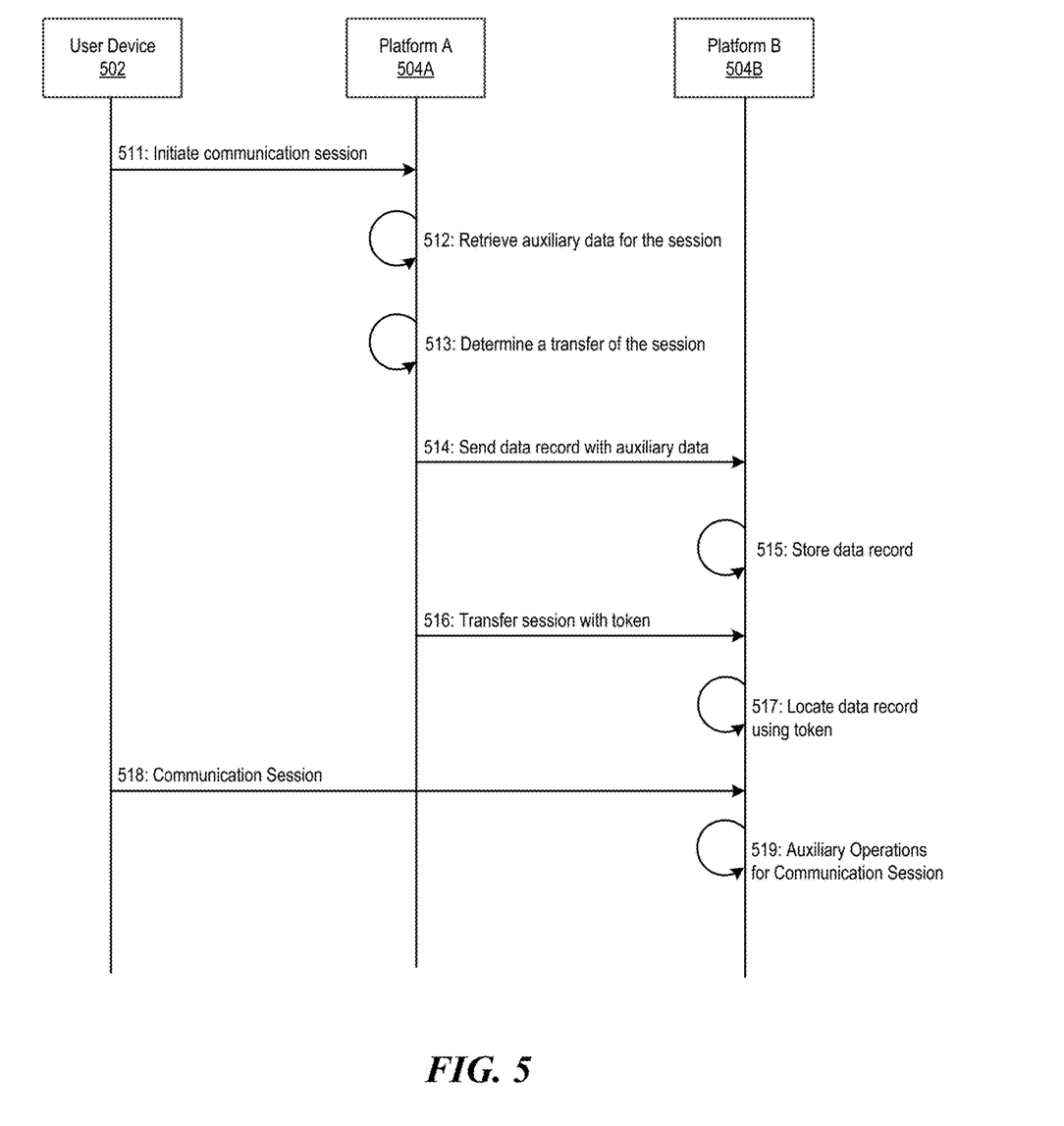
FIG. 5 is a sequence diagram that illustrates example operations performed for the exchange of a data record in connection with the transfer of a communication session.

FIG. 5 is a sequence diagram that illustrates example operations performed to share auxiliary session data in connection with a transfer of a communication session across platforms. As shown in FIG. 5, the example operations are performed by and/or involve a user device 502 that initiates or connects to a communication session, a first platform 504A ("Platform A"), and a second platform 504B ("Platform B"). In an example, the first platform 504A embodies an originating platform 310 and/or a platform 400, and the second platform 504B embodies a target platform 320 and/or a platform 400.

At 511, the user device 502 initiates (or connects to) a communication session at the first platform 504A. In one example, the first platform 504A is a call center or call routing platform with call agents, and the user device 502 initiates a voice call with the first platform 504A to speak to a call agent. In various examples, the communication session is a voice call (e.g., a telephone call, a VoIP call), a video meeting or call, an instant messaging session, and/or the like.

At 512, the first platform 504A retrieves auxiliary session data for the communication session. In various examples, the auxiliary session data includes profile or account data for user of the user device 502, billing information for the user device 502, session logs associated with the user device 502, a voiceprint of the user, a text transcription of audio in the communication session, and/or the like. In the call center example, the auxiliary session data includes data used by the first platform 504A to select a call agent to connect to the communication session.

At 513, the first platform 504A determines that the communication session is to be transferred to a second platform 504B. The first platform 504A determines the transfer of the communication session based on certain trigger events or conditions being satisfied. In an example, a call agent selected by the first platform 504A is located at the second platform 504B. In another example, the first platform 504A determines that the second platform 504B is associated with an appropriate domain to handle needs of the user device 502. In yet another example, the first platform 504A obtains or detects an indication by the user device 502 that the user desires to connect the user device 502 to the second platform 504B. In yet another example, the first platform 504A determines the transfer as part of a load balancing operation when a load at the first platform 504A exceeds a certain threshold. In determining the transfer of the communication session to the second platform 504B, the first platform 504A identifies the second platform 504B, for example, out of a population of potential target platforms.

At 514, the first platform 504A sends a data record that includes the auxiliary session data (or a portion thereof) to the second platform 504B. In some implementations, the first platform 504A sends the data record to the second platform 504B via an API of the second platform 504B. In some implementations, the first platform 504A formats the data record according to a standard format (e.g., JSON, XML) that is interpretable by the second platform 504B. In some implementations, the first platform 504A transmits the data record to the second platform 504B according to a standard protocol (e.g., HTTP, HTTPS) according to which the second platform 504B is configured to receive data.

At 515, the second platform 504B stores the data record. In some implementations, the data record is associated with an expiration or a lease time, and after the expiration or lease time elapses, the second platform 504B ceases storage of or removes the data record. In some implementations, the data record is copied to the second platform 5046.

At 516, the first platform 504A transfers the communication session concurrently with an accompanying token to the second platform 504B. In some implementations, the transfer of the communication session involves a SIP signaling or handshake. The transfer of the communication session and accompanying token occurs on a cross-platform channel or flow that is distinct from a cross-platform channel or flow via which the data record is sent to the second platform 504B. The token is configured to enable the second platform 504B to reference and retrieve the data record. In some implementations, the token has a structure that includes a first identifier associated with the first platform 504A a second identifier associated with the data record. In some implementations, the first identifier and the second identifier are concatenated in the token.

At 517, the second platform 504B locates and retrieves the data record using the token. In some implementations, the second platform 504B performs a protocol conversion from a first protocol (e.g., a proprietary protocol, a non-standard protocol) to a second protocol (e.g., a standard protocol, HTTPS) to facilitate retrieving the record.

At 518, the user device 502 is connected to the communication session at the second platform 504B. A participant residing or located at the second platform 504B is also connected to the communication session.

At 519, the second platform 504B performs auxiliary operations during the communication session using the auxiliary session data in the data record. In some implementations, the auxiliary operations are performed for the participant that resides or is located at the second platform 504B. As the communication session continues, the second platform 504B maintains the communication session according to SIP and can terminate the communication session when requested.

Exemplary Computer System

Figure 6:
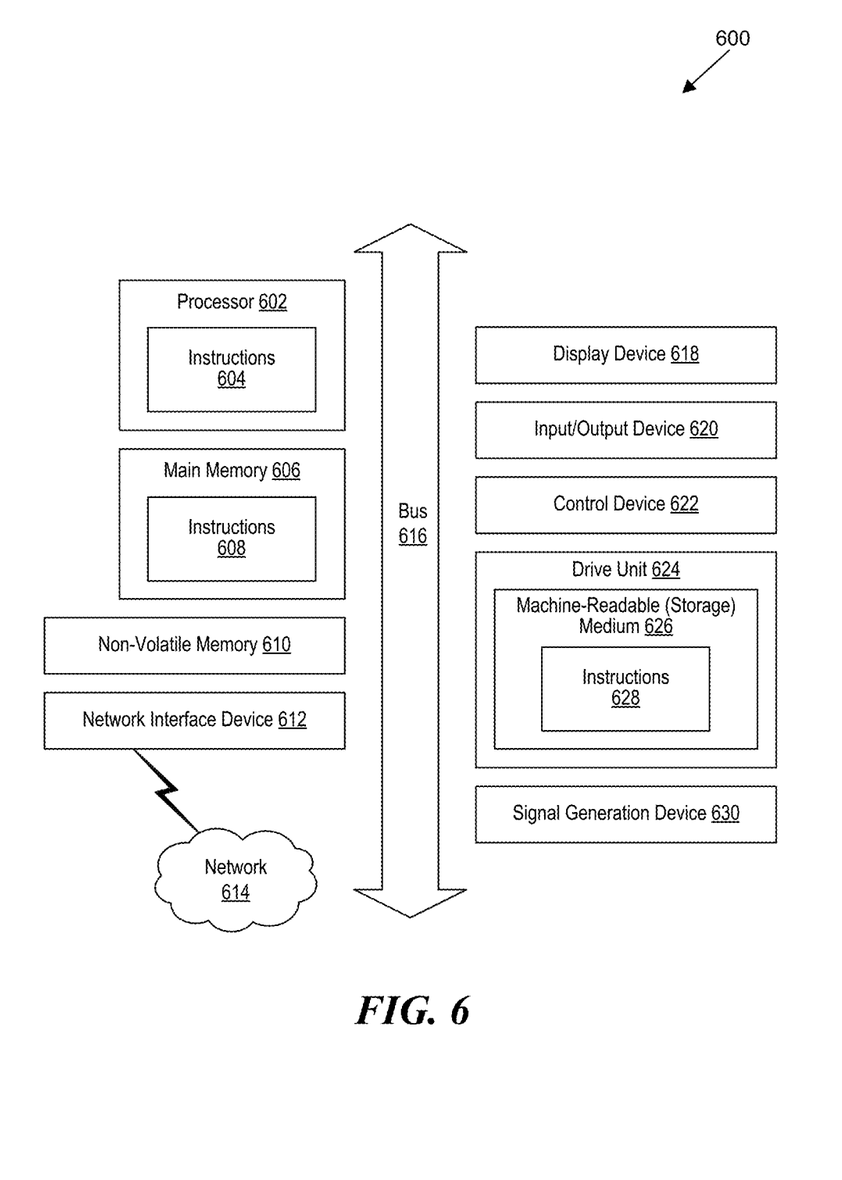
FIG. 6 is a block diagram that illustrates an example of a computer system in which at least some operations described herein can be implemented.

FIG. 6 is a block diagram that illustrates an example of a computer system 600 in which at least some operations described herein can be implemented. As shown, the computer system 600 can include: one or more processors 602, main memory 606, non-volatile memory 610, a network interface device 612, video display device 618, an input/output device 620, a control device 622 (e.g., keyboard and pointing device), a drive unit 624 that includes a storage medium 626, and a signal generation device 630 that are communicatively connected to a bus 616. The bus 616 represents one or more physical buses and/or point-to-point connections that are connected by appropriate bridges, adapters, or controllers. Various common components (e.g., cache memory) are omitted from FIG. 6 for brevity. Instead, the computer system 600 is intended to illustrate a hardware device on which components illustrated or described relative to the examples of the figures and any other components described in this specification can be implemented.

The computer system 600 can take any suitable physical form. For example, the computing system 600 can share a similar architecture as that of a server computer, personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computing system 600. In some implementation, the computer system 600 can be an embedded computer system, a system-on-chip (SOC), a single-board computer system (SBC) or a distributed system such as a mesh of computer systems or include one or more cloud components in one or more networks. Where appropriate, one or more computer systems 600 can perform operations in real-time, near real-time, or in batch mode.

The network interface device 612 enables the computing system 600 to mediate data in a network 614 with an entity that is external to the computing system 600 through any communication protocol supported by the computing system 600 and the external entity. Examples of the network interface device 612 include a network adaptor card, a wireless network interface card, a router, an access point, a wireless router, a switch, a multilayer switch, a protocol converter, a gateway, a bridge, bridge router, a hub, a digital media receiver, and/or a repeater, as well as all wireless elements noted herein.

The memory (e.g., main memory 606, non-volatile memory 610, machine-readable medium 626) can be local, remote, or distributed. Although shown as a single medium, the machine-readable medium 626 can include multiple media (e.g., a centralized/distributed database and/or associated caches and servers) that store one or more sets of instructions 628. The machine-readable (storage) medium 626 can include any medium that is capable of storing, encoding, or carrying a set of instructions for execution by the computing system 600. The machine-readable medium 626 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory devices 610, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 604, 608, 628) set at various times in various memory and storage devices in computing device(s). When read and executed by the processor 602, the instruction(s) cause the computing system 600 to perform operations to execute elements involving the various aspects of the disclosure.

REMARKS

The terms "example", "embodiment" and "implementation" are used interchangeably. For example, reference to "one example" or "an example" in the disclosure can be, but not necessarily are, references to the same implementation; and such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described which can be exhibited by some examples and not by others. Similarly, various requirements are described which can be requirements for some examples but no other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number may also include the plural or singular number respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel, or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the above Detailed Description explicitly defines such terms. Accordingly, the actual scope of the invention encompasses not only the disclosed examples, but also all equivalent ways of practicing or implementing the invention under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a mean-plus-function claim will use the words "means for." However, the use of the term "for" in any other context is not intended to invoke a similar interpretation. The applicant reserves the right to pursue such additional claim forms in either this application or in a continuing application.

We claim:

1. A multi-platform system for auxiliary call data peering, the multi-platform system comprising:
   a first platform at which a subscriber initiates a voice call, the first platform configured to:
   retrieve subscriber profile data specific to the subscriber in response to the subscriber initiating the voice call, wherein the subscriber profile data specific to the subscriber is stored in a first database within the first platform;

determine that a recipient for the voice call is connected to a second platform that is distinct from the first platform;

transmit, to the second platform via a first cross-platform channel, a data record that includes the subscriber profile data specific to the subscriber of the first platform, wherein a second database within the second platform is caused to store the data record; and transfer, to the second platform via a cross-platform communications channel, the voice call and an accompanying transfer request, wherein the transfer request includes a data token that is configured to uniquely reference the data record and includes a unique identifier associated with the first platform; and the second platform to which the first platform transfers the voice call, the second platform configured to:

connect the voice call for the recipient via a terminal associated with the second platform and the recipient;

obtain the subscriber profile data specific to the subscriber based on identifying, via the data token received in the transfer request, the data record stored in the second database; and perform at least one auxiliary operation with the voice call using the subscriber profile data.

2. The system of claim 1, wherein the at least one auxiliary operation includes at least one of: (i) an automated display of the subscriber profile data at the terminal associated with the recipient, (ii) an identification of a previous voice call established between the subscriber and the recipient, or (iii) a billing-related operation using payment information included in the subscriber profile data.

3. The system of claim 1, wherein the second database within the second platform is configured to remove the data record after an expiration time period that is associated with the data record elapses.

4. The system of claim 1, wherein the data token is configured to uniquely reference the data record based on including a first identifier that uniquely identifies the first platform among a plurality of platforms and a second identifier that uniquely identifies the data record.

5. The system of claim 1, wherein the transfer request including the data token is included in a Session Initiation Protocol (SIP) message to the second platform.

6. A system for auxiliary session data peering, the system comprising:

a session module configured to enable a user to establish a communication session with the system;

a database module configured to store auxiliary session data uniquely associated with each of a population of users that includes the user;

an auxiliary peering module configured to, in response to a determination to transfer the communication session to an external platform, send a data record that includes the auxiliary session data for the user to the external platform; and a transfer module configured to transfer the communication session to the external platform based on sending a transfer request to the external platform, wherein the transfer request includes a token that uniquely identifies the data record sent to the external platform.

7. The system of claim 6, wherein the auxiliary peering module sends the data record to the external platform via a first cross-platform channel with the external platform, and wherein the transfer module transfers the communication session via a second cross-platform channel with the external platform.

8. The system of claim 6, wherein the auxiliary peering module is configured to send the data record to a second database module of the external platform, and wherein the transfer module is configured to send the transfer request to a second session module of the external platform.

9. The system of claim 6, wherein the data record is associated with an expiration time period after which the data record is inaccessible by the external platform.

10. The system of claim 6, wherein the database module is further configured to store a plurality of data records received from a plurality of external platforms, the plurality of data records including user data defined by the plurality of external platforms.

11. The system of claim 6, wherein the auxiliary peering module is configured to transmit the data record in accordance with HyperText Transfer Protocol (HTTP) and to send the data record via an application programming interface (API) of a second database module of the external platform.

12. The system of claim 6, wherein the transfer module generates the data record to include a first identifier that identifies the system to the external platform and a second identifier that identifies the data record sent to the external platform.

13. The system of claim 6, wherein the determination to transfer the communication session to the external platform is made by the system based on the auxiliary session data uniquely associated with the user.

14. The system of claim 6, wherein the determination to transfer the communication session to the external platform is made by the system based on evaluating a purpose of the communication session that is indicated by the user.

15. A system for auxiliary session data peering, the system comprising:

a database module configured to store a plurality of data records received from a plurality of external platforms, each data record including auxiliary session data associated with one of a plurality of users;

a transfer module configured to:

receive, from a particular external platform, a transfer request for a particular communication session initiated by a first user at the particular external platform, and provide the particular communication session to a second user that is connected to the system; and an auxiliary operation module configured to:

identify a particular data record associated with the first user using a token included in the transfer request that uniquely references the particular data record, and perform, while the second user is on the particular communication session, at least one auxiliary operation using the auxiliary session data included in the particular data record.

16. The system of claim 15, wherein the transfer module receives the transfer request via a first cross-platform channel, and wherein the database module receives the plurality of data records via a second cross-platform channel.

17. The system of claim 15, wherein the at least one auxiliary operation includes at least one of: (i) an automated display of the auxiliary session data at a terminal associated with the second user, (ii) an identification of a previous communication session between the first user and the second user, or (iii) a billing-related operation using payment information included in the auxiliary session data.

18. The system of claim 15, wherein the auxiliary session data includes user profile data.

19. The system of claim 15, wherein the database module is configured to store each data record for up to an expiration time associated with each data record.

20. The system of claim 15, wherein the auxiliary operation module identifies the particular data record based on the token including a first identifier associated with the particular external platform and a second identifier associated with the particular data record.

* * * * *